(12) United States Patent
Uchino et al.

(10) Patent No.: US 12,341,391 B2
(45) Date of Patent: Jun. 24, 2025

(54) STATOR FOR ROTARY ELECTRIC MACHINE

(71) Applicant: KABUSHIKI KAISHA TOSHIBA, Tokyo (JP)

(72) Inventors: Yuki Uchino, Kanagawa (JP); Minoru Awazu, Kanagawa (JP); Takahiro Toi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 420 days.

(21) Appl. No.: 17/899,391

(22) Filed: Aug. 30, 2022

(65) Prior Publication Data

US 2023/0103747 A1 Apr. 6, 2023

(30) Foreign Application Priority Data

Oct. 1, 2021 (JP) .................................. 2021-162814

(51) Int. Cl.
*H02K 3/34* (2006.01)
*H02K 3/52* (2006.01)

(52) U.S. Cl.
CPC .............. *H02K 3/345* (2013.01); *H02K 3/34* (2013.01); *H02K 3/522* (2013.01); *H02K 2203/12* (2013.01)

(58) Field of Classification Search
CPC .......... H02K 3/34; H02K 3/345; H02K 3/487; H02K 3/493; H02K 3/522; H02K 3/325; H02K 2203/12; H02K 1/148

(Continued)

(56) References Cited

U.S. PATENT DOCUMENTS 8,661,651 B2 3/2014 Tsuiki et al.
2003/0127936 A1* 7/2003 Katou .................... H02K 15/10
310/215

(Continued)

FOREIGN PATENT DOCUMENTS

DE 10-2008-023923 A1 1/2009
EP 3 176 915 A1 6/2017

(Continued)

OTHER PUBLICATIONS

Office Action issued in Japanese Patent Application No. 2021-162814 dated Oct. 8, 2024 in 10 pages.

(Continued)

*Primary Examiner* — Alexander A Singh
(74) *Attorney, Agent, or Firm* — Knobbe, Martens, Olson & Bear, LLP

(57) ABSTRACT

A stator for a rotary electric machine of an embodiment includes: a dividing core including a yoke portion and a teeth portion protruding in an inner peripheral direction from the yoke portion; bobbins that are made of an insulating material and are arranged on both ends in an axial direction of the dividing core; a coil that is wound around the bobbin; and insulating papers that are arranged along an inner peripheral surface of the yoke portion and a side surface of the teeth portion and insulate the coil and the dividing core from each other between both the bobbins, and each of the bobbins is formed with a groove into which an axial end of the insulating paper is inserted, and the groove is configured such that a width dimension of a part along the inner peripheral surface of the yoke portion is larger than a width dimension of a part along the side surface of the teeth portion.

4 Claims, 10 Drawing Sheets

(58) Field of Classification Search
USPC .................................................. 310/214, 215
See application file for complete search history.

(56) References Cited

U.S. PATENT DOCUMENTS

| | | | |
|---|---|---|---|
| 2007/0222324 A1* | 9/2007 | Fukui | H02K 9/223 |
| | | | 310/260 |
| 2013/0049521 A1 | 2/2013 | Sato | |
| 2019/0052135 A1 | 2/2019 | Haruno et al. | |
| 2019/0074735 A1 | 3/2019 | Shono et al. | |

FOREIGN PATENT DOCUMENTS

| | | | |
|---|---|---|---|
| JP | 2012239347 A | 12/2012 |
| JP | 2013-247801 A | 12/2013 |
| JP | 5815163 B1 | 11/2015 |
| JP | 6580252 B2 | 9/2019 |
| JP | 6689394 B2 | 4/2020 |

OTHER PUBLICATIONS

Decision to Grant issued in Japanese Patent Application No. 2021-162814, dated Dec. 3, 2024 in 6 pages.

\* cited by examiner

STATOR FOR ROTARY ELECTRIC MACHINE

RELATED APPLICATIONS

This application claims priority to Japanese Patent Application No. 2021-162814, filed on Oct. 1, 2021, the contents of which are incorporated herein by reference in its entirety. Any and all applications, if any, for which a foreign or domestic priority claim is identified in the Application Data Sheet of the present application are hereby incorporated by reference in their entireties under 37 CFR 1.57.

BACKGROUND OF THE INVENTION

Field of the Invention

An embodiment of the present invention relates to a stator for a rotary electric machine including an insulating paper for insulating a dividing core and a coil from each other.

Description of the Related Art

In a rotary electric machine, for example, a compressor motor for an air conditioner, a so-called concentrated winding coil is configured as a stator in which a dividing core integrally includes a yoke portion and a teeth portion protruding in an inner peripheral direction from the yoke portion, a coil is wound around the teeth portion, and then a plurality of dividing cores are combined in an annular shape. In such a concentrated winding coil, in order to insulate the dividing core and the coil from each other, upper and lower bobbins made of plastic are provided so as to be fitted to the teeth portion from both sides in an axial direction, and insulating papers are provided on other exposed parts of the dividing core (for example, see Japanese Patent Laid-Open No. 2012-239347). The insulating paper has a quadrangular shape that is bent in an L-shape or a U-shape when viewed in the axial direction so as to cover an inner peripheral surface of the yoke portion and a side surface of the teeth portion, and a pair of insulating papers are arranged on both sides of the teeth portion so as to be sandwiched between the upper and lower bobbins.

By the way, in the insulating structure of the concentrated winding coil with such a configuration, the pair of upper and lower bobbins are arranged on an end surface of the dividing core, the insulating papers bent substantially in the L-shape or the U-shape when viewed in the axial direction are inserted and arranged from the side of the teeth portion, and then the coil wire is wound to manufacture the coil. However, there is a problem in the above steps that the work of inserting the insulating papers from the side of the teeth portion is not easy, the insulating papers are difficult to be positioned and temporarily fixed, and an assembling property of the insulating papers deteriorates.

Therefore, a stator for a rotary electric machine is provided which can improve the assembling property of the insulating papers by assembling of the bobbins and the insulating papers to the dividing core.

SUMMARY OF THE INVENTION

A stator for a rotary electric machine of an embodiment includes: a dividing core including a yoke portion and a teeth portion protruding in an inner peripheral direction from the yoke portion; bobbins that are made of an insulating material and are arranged on both ends in an axial direction of the dividing core; a coil that is wound around the bobbin; and insulating papers that are arranged along an inner peripheral surface of the yoke portion and a side surface of the teeth portion and insulate the coil and the dividing core from each other between both the bobbins, and each of the bobbins is formed with a groove into which an axial end of the insulating paper is inserted, and the groove is configured such that a width dimension of a part along the inner peripheral surface of the yoke portion is larger than a width dimension of a part along the side surface of the teeth portion.

DETAILED DESCRIPTION OF THE PREFERRED EMBODIMENT

Figure 1:
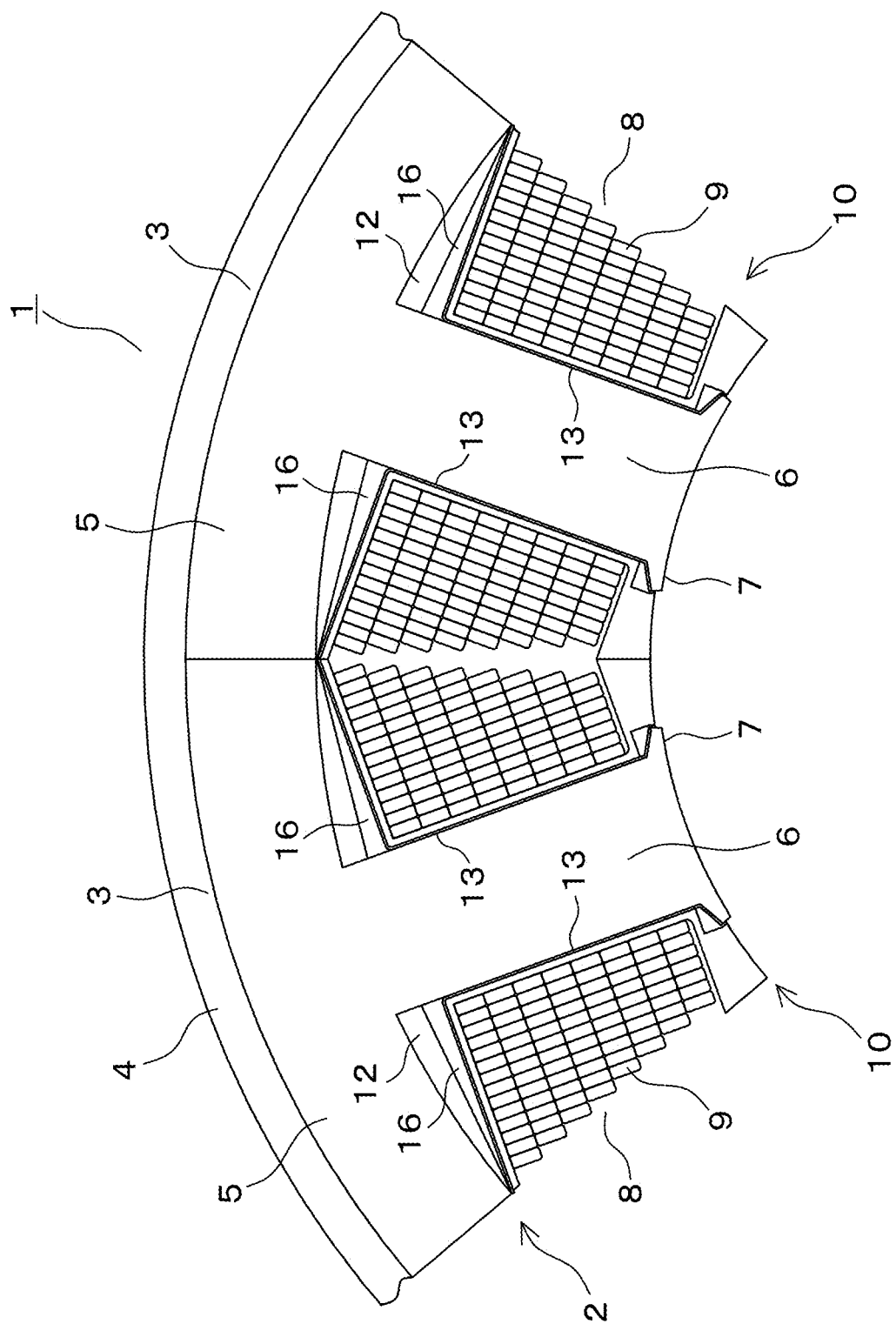
FIG. 1 is a cross-sectional view schematically showing a configuration of a stator according to an embodiment.

Hereinafter, an embodiment applied to a stator of a compressor motor for an air conditioner, for example, as a rotary electric machine will be described with reference to the drawings. In the following description and drawings, an extension direction of a rotating shaft of the motor will be described as an up-down direction, for convenience. FIG. 1 partially shows a configuration of a stator 1 for a motor according to the present embodiment, and the stator 1 includes a stator core 2 that is formed in an annular shape as a whole. The stator core 2 is configured in a manner that a plurality of dividing cores 3 are coupled to each other by a ring member 4 on an outer peripheral portion.

Figure 2:
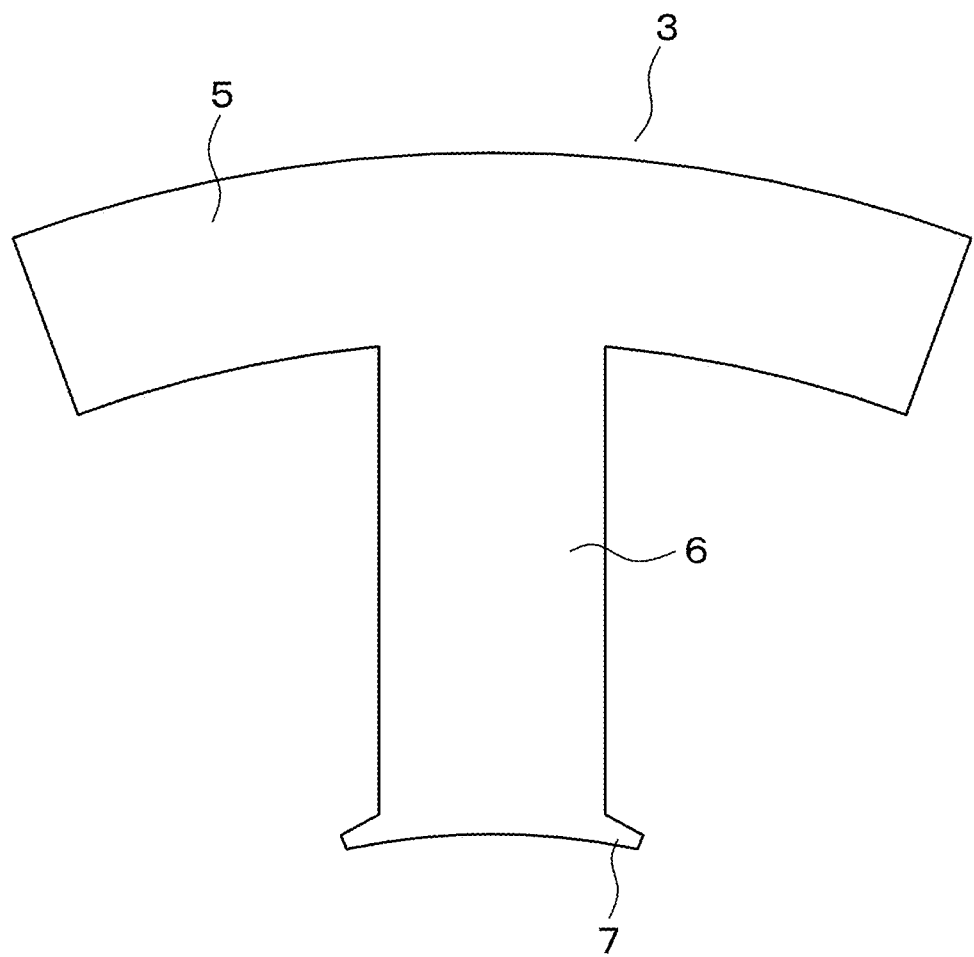
FIG. 2 is a plan view showing a dividing core.
Figure 3:
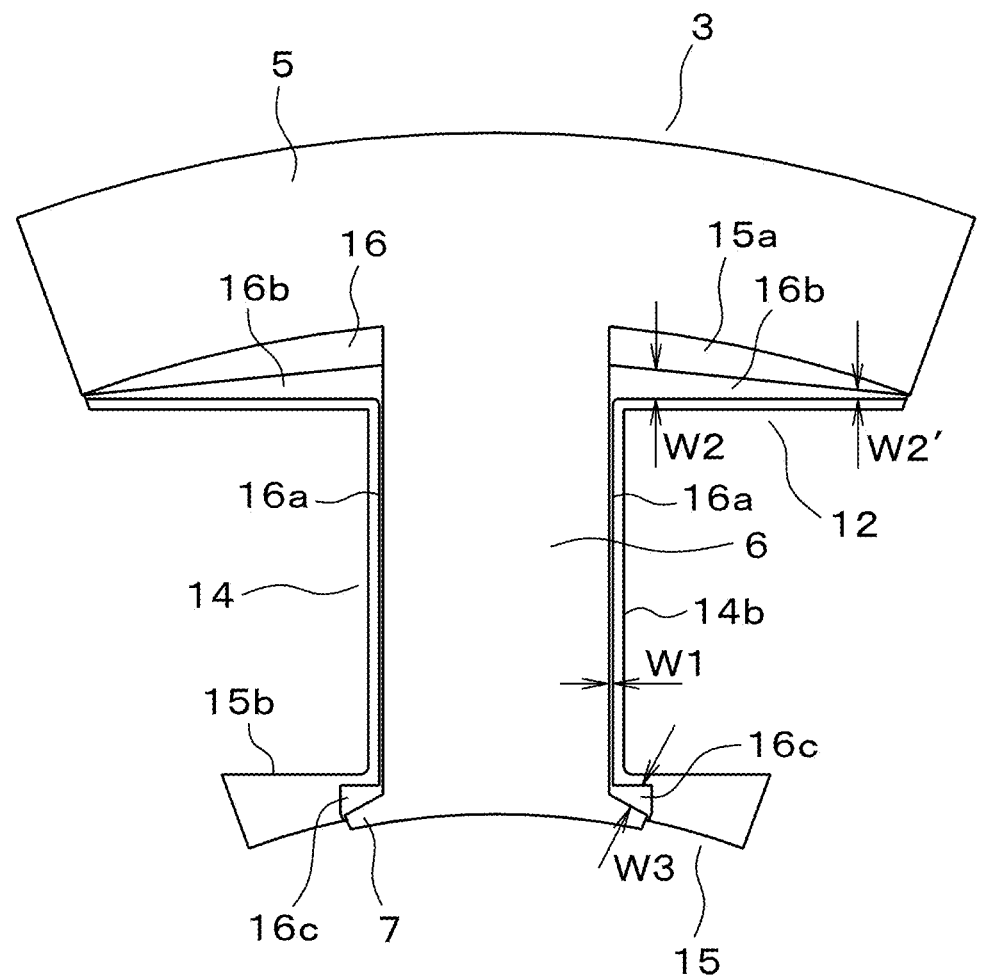
FIG. 3 is an enlarged plan view showing a state where a lower bobbin is mounted to the dividing core.

Each of the dividing cores 3 is configured in a manner that a plurality of electrical steel sheets are laminated in an axial direction, that is, in an up-down direction in FIGS. 5 to 10, and includes a yoke portion 5 on an outer peripheral side and a teeth portion 6 extending in an inner peripheral direction from the yoke portion 5 as shown in FIGS. 2 to 6. In the present embodiment, as shown in FIGS. 2 and 3, an inner peripheral surface of the yoke portion 5 is configured in a circular arc shape when viewed in the axial direction. Further, the teeth portion 6 includes a tip portion 7 spreading in a circumferential direction at a tip thereof.

Figure 10:
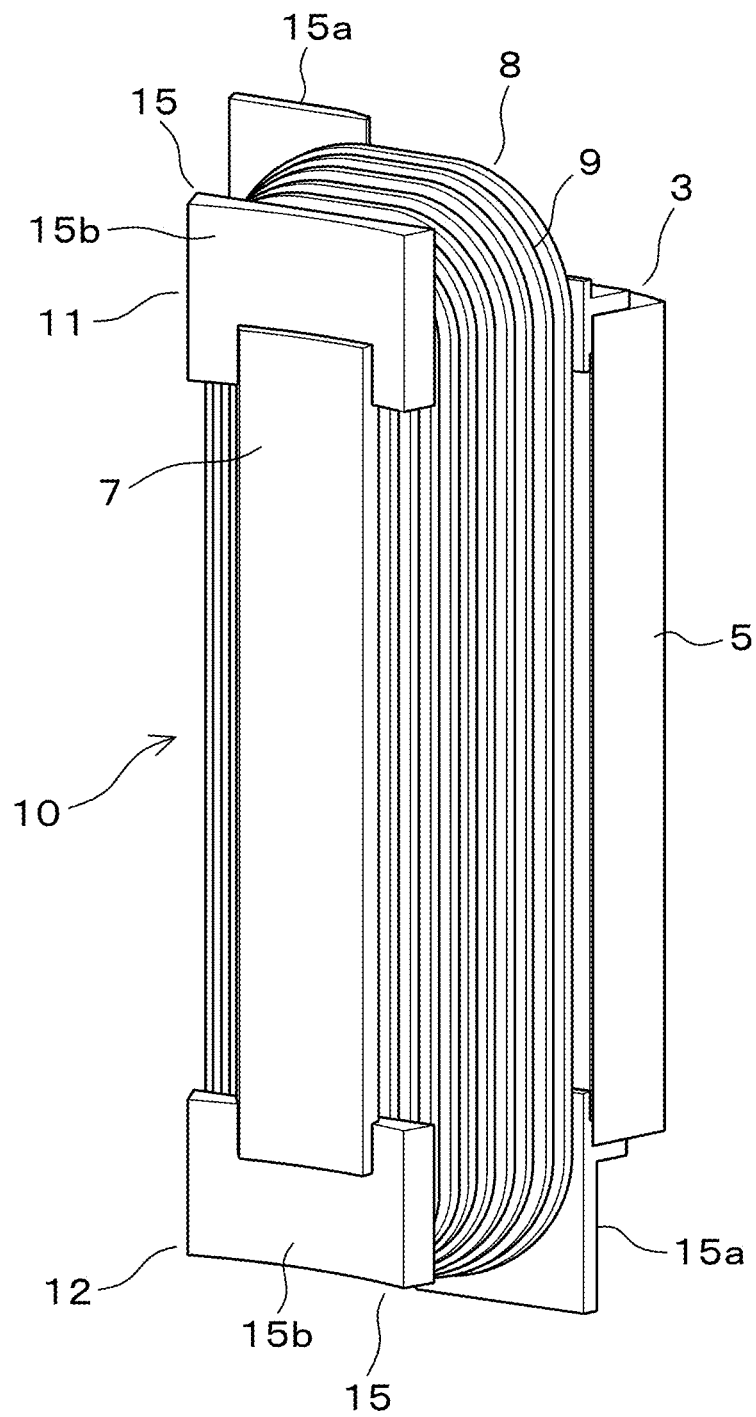
FIG. 10 is a perspective view of a concentrated winding coil in which the coil is wound.

As shown in FIGS. 1 and 10, a coil 8 is wound around the teeth portion 6 of each of the dividing cores 3 to form a concentrated winding coil 10. In the present embodiment, as shown in FIG. 1, the coil 8 is configured in a manner that a wire 9 made of a rectangular wire having a substantially rectangular cross section is wound, for example. At this time, an insulating structure according to the present embodiment is provided between the dividing core 3 and the coil 8. Details of the insulating structure will be described below. Although not shown, the stator 1 is incorporated in a motor frame, and a rotor is arranged on an inner peripheral portion thereof with a slight gap to form a motor.

Figure 4:
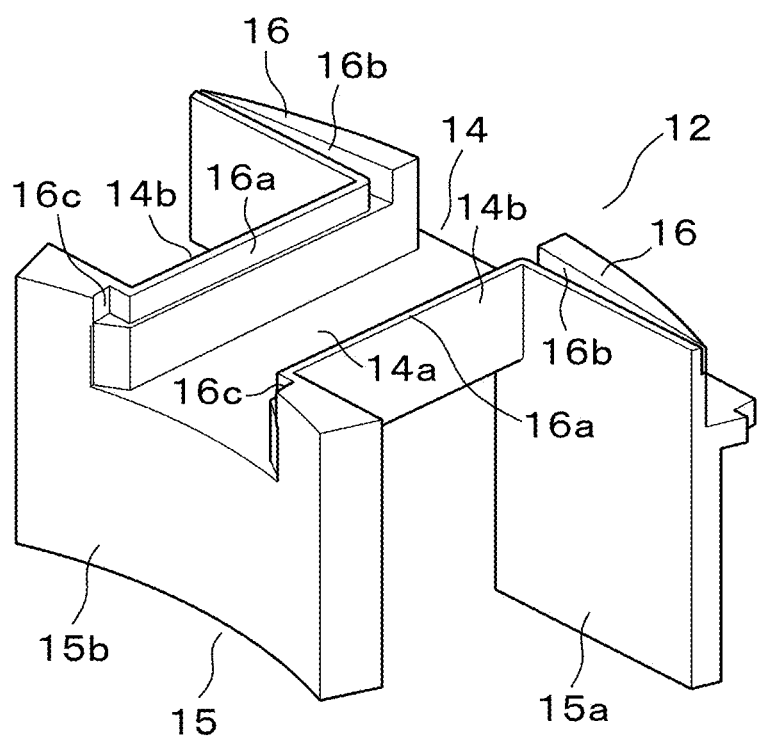
FIG. 4 is an enlarged perspective view showing the lower bobbin.
Figure 5:
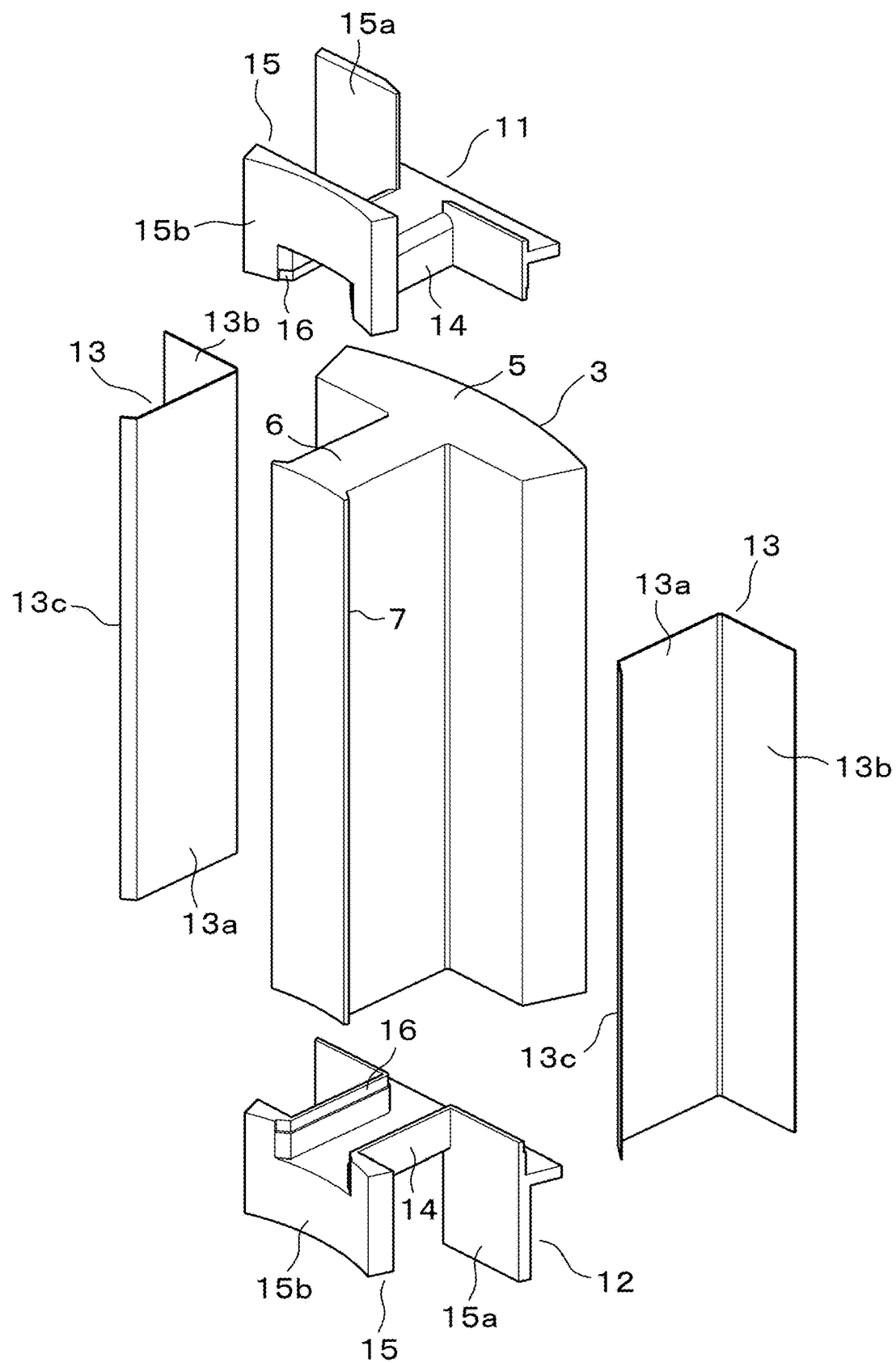
FIG. 5 is an exploded perspective view of a dividing core, bobbins, and insulating papers.

The insulating structure provided between the dividing core 3 and the coil 8 will be described in detail with reference to FIGS. 2 to 10. As shown in FIGS. 5 and 9, in the present embodiment, the insulating structure includes an upper bobbin 11 made of an insulating material and arranged on an upper end side of the teeth portion 6 of the dividing core 3, a lower bobbin 12 made of an insulating material and arranged on a lower end side of the teeth portion 6, and left and right insulating papers 13 and 13 provided so as to cover a side surface of the teeth portion 6 and the inner peripheral surface of the yoke portion 5 between both the bobbins 11 and 12.

Figure 7:
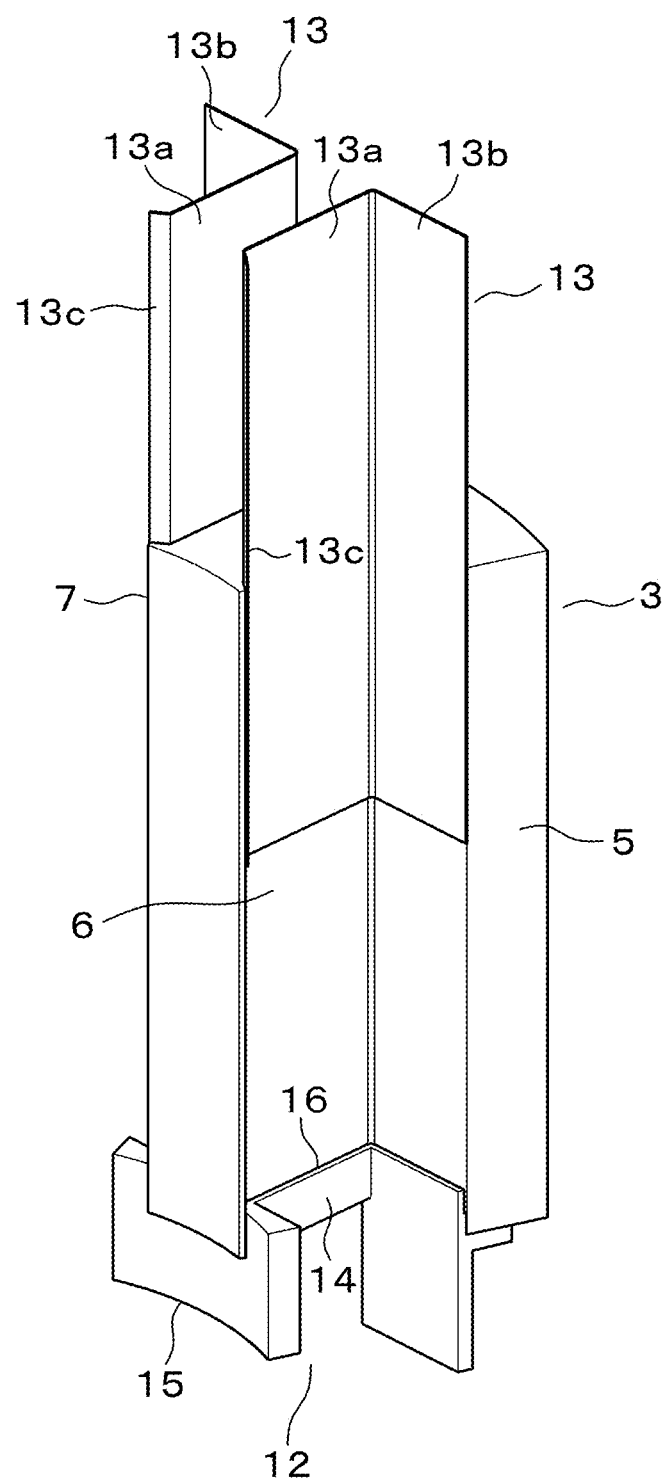
FIG. 7 is a perspective view showing a state of assembling the insulating papers.

The insulating paper 13 is made of, for example, aramid paper having a thickness dimension of 0.18 mm, and a wide rectangular section thereof is bent into an substantially L shape when viewed in the axial direction as shown in FIGS. 5 and 7. More specifically, the insulating paper 13 integrally includes a first part 13a having a vertically long rectangular shape arranged inside the side surface of the teeth portion 6 and a second part 13b having a vertically long rectangular shape arranged inside the inner peripheral surface of the yoke portion 5 so as to be bent substantially at a right angle from a rear end of the first part 13a. Further, in the present embodiment, a third part 13c having a narrow width is integrally provided that is located on a tip side of the first part 13a to be bent at an angle close to a right angle and is arranged along a surface facing the inside of the tip portion 7.

As shown in FIG. 5, the upper bobbin 11 and the lower bobbin 12 have equivalent configurations that are symmetrical to each other in the up-down direction, for example. Hereinafter, the lower bobbin 12 will be described as a representative. As shown in FIG. 4, the lower bobbin 12 is made of an insulating material, for example, plastic, and includes integrally a fitting portion 14 that is fitted to an end of the teeth portion 6 from below and is wound by the coil 8 and a flange portion 15 that extends downward from the fitting portion 14 at the inner peripheral portion and the outer peripheral portion and receives a coil end of the coil 8 at the inner and outer peripheral portions.

More specifically, as shown in FIG. 4, the fitting portion 14 of the lower bobbin 12 has a rectangular plate shape that is slightly longer in a front-rear direction in the drawing, and includes a main wall 14a that is arranged on a lower surface of the teeth portion 6 in the drawing and left and right rising walls 14b and 14b that rise upward at a predetermined height from left and right side edges of the main wall 14a in the drawing. The flange portion 15 includes a yoke-side guide wall 15a that is located on a base end side of the teeth portion 6, that is, on the inner peripheral surface of the yoke portion 5 and a tip-side guide wall 15b that is located on a tip side of the teeth portion 6, that is, on the inner peripheral surface of the tip portion 7.

The yoke-side guide wall 15a has a plate shape that spreads in a circumferential direction, that is, a left-right direction from a rear end of the fitting portion 14 and extends downward, and an upper end thereof has the same height as the rising walls 14b and 14b except for the part where the teeth portion 5 is arranged. Further, as shown in FIG. 3, the yoke-side guide wall 15a has a linear inner surface that is substantially at right angle from the side surface of the teeth portion 6 when viewed in the axial direction and an outer surface having a circular arc bulging shape so as to follow a circular arc shape of the inner peripheral surface of the yoke portion 5. Thus, the yoke-side guide wall 15a is provided to be thicker than the rising wall 14b.

Further, as shown in FIGS. 3 to 9, the tip-side guide wall 15b has a rectangular plate shape that spreads in a circumferential direction, that is, a left-right direction from a front end of the fitting portion 14 and extends downward, and an upper end thereof has the same height as the rising walls 14b and 14b except for the part where the teeth portion 5 is arranged. Further, as shown in FIG. 3, the tip-side guide wall 15b is located on the inner peripheral surface of the tip portion 7, and is provided to be thicker than the rising wall 14b.

Then, on an upper surface of the lower bobbin 12, a groove 16 is formed into which axial ends of the insulating papers 13 and 13, that is, a lower end in this case is inserted. As shown in FIGS. 3 and 4, the groove 16 includes a first part 16a, a second part 16b, and a third part 16c that are provided continuously. The first part 16a is provided along the side surface of the teeth portion 6 on the upper end surface of the rising wall 14b, the second part 16b is provided along a side opposite to the yoke portion 5 on the upper end surface of the yoke-side guide wall 15a, and the third part 16c is provided along the inner peripheral surface of the tip portion 7 on the upper end surface of the tip-side guide wall 15b. In this case, lower ends of the first part 13a, the second part 13b, and the third part 13c of the insulating paper 13 are inserted into the first part 16a, the second part 16b, and the third part 16c of the groove 16, respectively.

At this time, as shown in FIG. 3, in the groove 16, a width dimension W1 of the first part 16a is relatively small, for example, 0.2 mm which is slightly larger a thickness dimension of the insulating paper 13. On the other hand, a width dimension of the second part 16b is larger than that of the first part is configured to be 1.5 times to 2 times, for example. Specifically, the width dimension of the second part 16b is configured such that a width dimension W2 on a root side of the teeth portion 6 is relatively large, for example, 0.4 mm, the width becomes gradually narrower as a distance is away in the left and right direction from the root side in the drawing, and a width dimension W2' on a front side is, for example 0.3 mm. Further, a width dimension W3 of the third part 16c is also larger than the width dimension W1 of the first part 16a, for example, about 0.3 mm.

Although details are not described, the upper bobbin 11 has substantially a symmetrical configuration in the up-down direction with the lower bobbin 12 that is vertically inversed. Therefore, the upper bobbin 11 is made of an insulating material, for example, plastic, and includes integrally a fitting portion 14 that is fitted to an end of the teeth portion 6 from above and is wound by the coil 8 and a flange portion 15 that extends upward from the fitting portion 14 at the inner peripheral portion and the outer peripheral portion and receives a coil end of the coil 8 at the inner and outer peripheral portions. Then, on a lower surface of the upper bobbin 11, a groove 16 is formed into which upper ends of the insulating papers 13 and 13 are inserted. The flange portion 15 of the upper bobbin 11 is slightly different in shape from the flange portion 15 of the lower bobbin 12.

Figure 6:
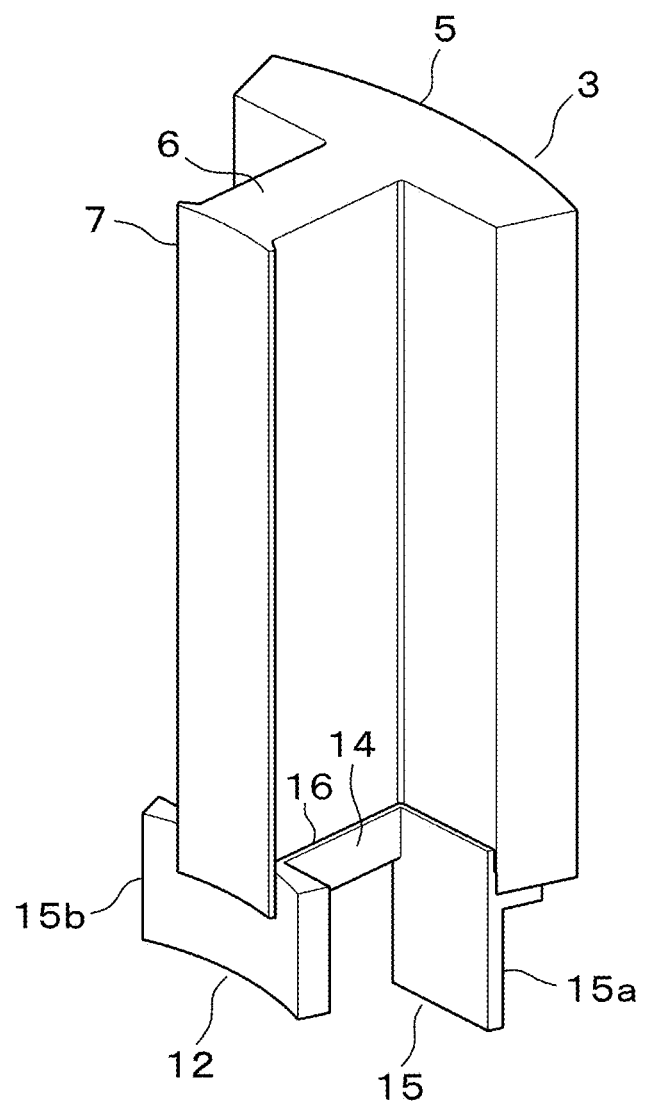
FIG. 6 is a perspective view showing a state in which the lower bobbin is assembled to the dividing core.

Next, an operation of the stator 1 with such a configuration will be described with reference to FIGS. 6 to 10. In the present embodiment, the upper bobbin 11, the lower bobbin 12, and the insulating papers 13 and 13 are assembled to the dividing core 3 as follows. In other words, as shown in FIG. 6, first, the upper end of the lower bobbin 12 is fitted to the lower end of the teeth portion 6 of the dividing core 3. In this state, as shown in FIG. 3, the fitting portion 14 of the lower bobbin 12 is fitted to the lower end of the teeth portion 6. Moreover, as viewed in the axial direction, the yoke-side guide wall 15a of the flange portion 15 is arranged in the circular arc shape along the inner peripheral surface of the yoke portion 5, and the tip-side guide wall 15b is arranged on the inner peripheral surface of the tip portion 7.

Next, as shown in FIG. 7, the insulating papers 13 and 13 are slid from above the dividing core 3, and the lower ends thereof are thrusted into the groove 16 of the lower bobbin 12. In this case, the first part 13a of the insulating paper 13 is arranged inside the side surface of the teeth portion 6, the second part 13b is arranged inside the inner peripheral surface of the yoke portion 5, and the third part 13c is arranged along the surface facing the inside of the tip portion 7. The lower end of the first part 13a of the insulating paper 13 is inserted into the first part 16a of the groove 16, the lower end of the second part 13b is inserted into the second part 16b, and the lower end of the third part 13c is inserted into the third part 16c.

When the axial ends of the insulating papers 13 and 13 are inserted into the groove 16 provided on the lower bobbin 12 in this way, the insulating papers 13 and 13 can be positioned and temporarily fixed. In the present embodiment, the groove 16 provided on the lower bobbin 12 is configured such that the width dimension W2 of the second part 16b along the inner peripheral surface of the yoke portion 5 is larger than the width dimension W1 of the first part 16a along the side surface of the teeth portion 6. Thereby, the lower end of the second part 13b of the insulating paper 13 may be entirely inserted in the groove 16 while being first positioned and inserted into the second part 16b having the wide width in the groove 16, and thus the insertion is extremely easily performed. In particular, since the width dimension W3 of the third part 16c of the groove 16 is also made large into which the tip of the third part 13c of the insulating paper 13 is inserted, the insulating paper 13 can be more easily inserted.

Figure 8:
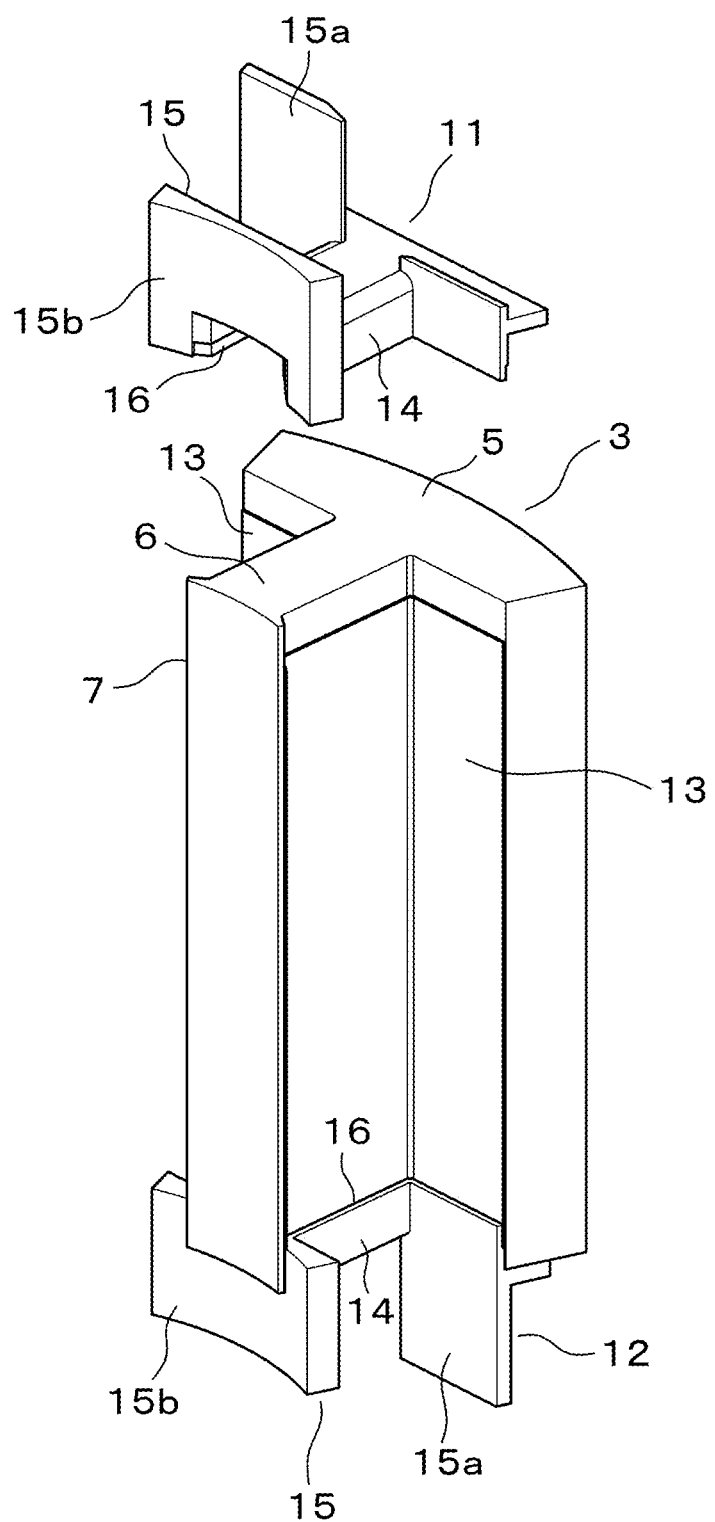
FIG. 8 is a perspective view showing a state of assembling the upper bobbin.
Figure 9:
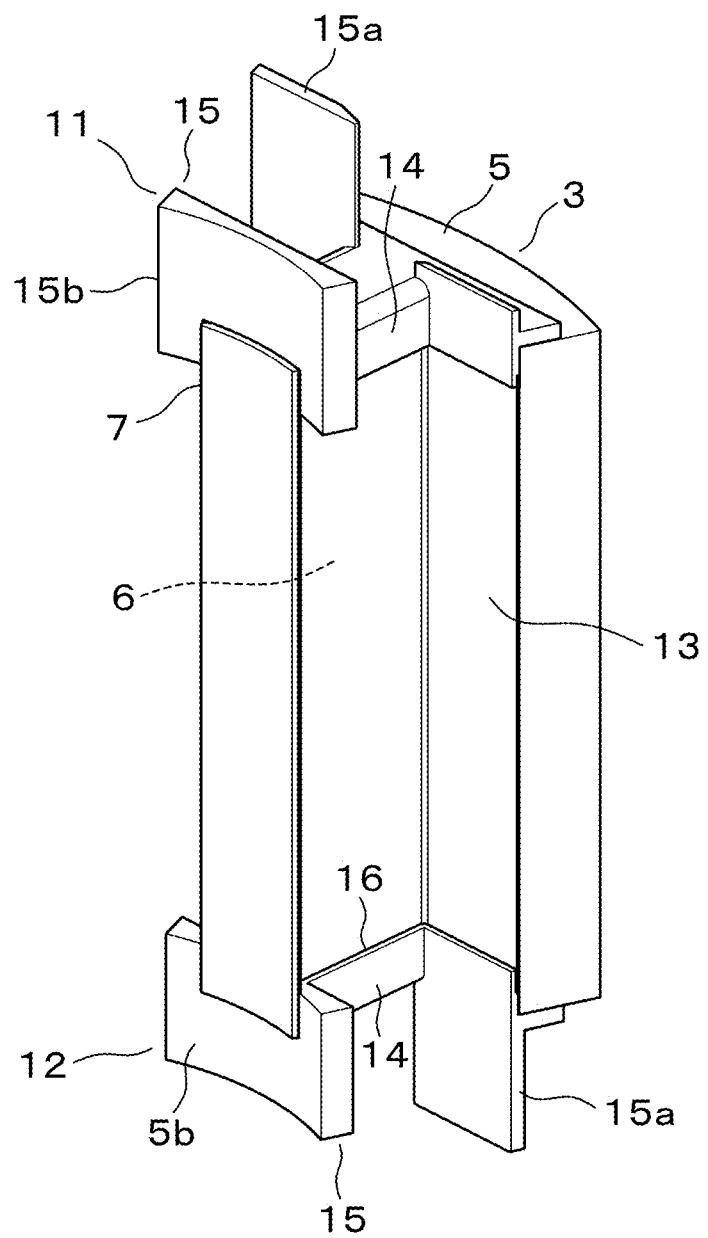
FIG. 9 is a perspective view showing the dividing core in a state before a coil is wound.

Thereafter, as shown in FIG. 8, the upper bobbin 11 is fitted from above the dividing core 3. Even at this time, the upper ends of the insulating papers 13 and 13 are inserted so as to be relatively thrusted into the groove 16 provided on the lower surface of the upper bobbin 11. Even at this time, the upper end of the insulating paper 13 can also be relatively easily inserted into the groove 16. Thus, as shown in FIG. 9, the upper bobbin 11 and the lower bobbin 12 are mounted on the upper and lower ends of the teeth portion 6 of the dividing core 3, respectively, and the inner peripheral surface of the yoke portion 5 and the insulating papers 13 and 13 are fixedly arranged on the side surface of the teeth portion 6 so as to cover the inner surface of the tip portion 7.

Thereafter, the coil 8 is wound around the teeth portion 6 of the dividing core 3. The coil 8 is configured in a manner that the wire 9 made of the rectangular wire is wound. At this time, the dividing core 3 and the coil 8 are insulated from each other by the upper bobbin 11, the lower bobbin 12, and the insulating papers 13 and 13. Thereby, the concentrated winding coil 10 shown in FIG. 10 is obtained, and a plurality of finished concentrated winding coils 10 can be combined in an annular shape using the ring member 4, whereby the stator 1 can be obtained.

According to the present embodiment described above, the following excellent effects can be obtained. In other words, the upper bobbin 11 and the lower bobbin 12 are provided with the grooves 16 into which the axial ends of the insulating papers 13 are inserted, and the groove 16 is configured such that the width dimension W2 of the second part 16b along the inner peripheral surface of the yoke portion 5 is larger than the width dimension W1 of the first part 16a along the side surface of the teeth portion 6. Thereby, the second part 13b of the insulating paper 13 may be entirely inserted in the groove 16 while being first positioned and inserted into the second part 16b having the wide width in the groove 16, and thus the insertion is extremely easily performed.

In this case, it is not necessary to increase the overall thickness of the upper bobbin 11 and the lower bobbin 12, and the upper bobbin 11 and the lower bobbin 12 may have a required thickness at only a part where the width dimension of the groove 16 desired to be increased, and can be formed with a relatively simple configuration. In other words, a part of the bobbins 11 and 12 along the side surface of the teeth portion 6 can be made relatively thin, and a high space factor of the coil 8 can be secured. As a result, the bobbins 11 and 12 and the insulating papers 13 and 13 are assembled to the dividing core 3, and it is possible to obtain an excellent effect that the assembling property of the insulating paper 13 can be improved.

Particularly, in the present embodiment, the inner peripheral surface of the yoke portion 5 has the circular arc shape when viewed in the axial direction, whereas the yoke-side guide walls 15a of the flange portions 15 of the bobbins 11 and 12 have a linear inner surface that is substantially at right angle from the side surface of the teeth portion 6 when viewed in the axial direction and the outer surface having the circular arc bulging shape so as to follow the circular arc shape of the inner peripheral surface of the yoke portion 5. Thus, the yoke-side guide wall 15a is provided to be thicker than the rising wall 14b. Thereby, the yoke-side guide wall 15a can be made relatively thick using the circular arc shape of the inner peripheral surface of the yoke portion 5, and the second part 16b of the groove 16 can be formed so as to have a wide width. It is possible to form the inner surface of the yoke-side guide wall 15a without reducing a winding space of the coil 8.

In the present embodiment, the width of the second part 16b along the inner peripheral surface of the yoke portion 5 in the groove 16 of each of the bobbins 11 and 12 is configured such that the width on a root side of the teeth portion 6 is large and becomes gradually narrower as a distance is away from the root side. Thus, the second part 16b of the groove 16 can be easily formed with the width corresponding to the shape of the yoke-side guide wall 15a of each of the bobbins 11 and 12. In this case, the second part 16b of the groove 16 can be easily formed such that a part of the yoke-side guide wall 15a other than the second part 16b is not unnecessarily thinned.

In the present embodiment, the tip portion 7 is provided at the tip of the teeth portion 6 of the dividing core 3, and the tip-side guide wall 15b is provided to be thicker than the rising wall 14b corresponding to the surface of the bobbins 11 and 12 facing the inside of the tip portion 7. Then, the insulating paper 13 is provided with the third part 13a corresponding to the tip portion 7, and the tip-side guide wall 15b is provided with the third part 16c of the groove 16 in a relatively wide width. Thus, even at the tip of the third part 13c of the insulating paper 13, the width dimension W3 of the third part 16c of the groove 16 of each of the bobbins 11 and 12 to be inserted becomes larger, which is effective to facilitate the insertion of the insulating paper 13.

Even in this case, the tip-side guide wall 15b of each of the bobbins 11 and 12 arranged on the surface facing the inside of the tip portion 7 can be configured to be thick without affecting the space factor, and the groove width of the third part 16c can be made large, whereby the insulating paper 13 can be easily inserted. Moreover, in the present embodiment, since the coil 8 is configured in a manner that the wire 9 made of the rectangular wire is wound, the space factor of the coil 8 can be sufficiently increased, and a small and high-performance stator and thus a high-efficiency motor can be obtained.

In the embodiment described above, the inner peripheral surface of the yoke portion is configured in the circular arc shape, but may be linear. In this case, the bobbin may also include a flange portion that follows the shape of the inner surface of the yoke portion. The width dimension of the second part of the groove may be constant. It can also be applied to a dividing core not including a tip portion. The wire of the coil is not limited to the rectangular wire, and may be a round wire having a circular cross section. Specific numerical values, for example, the thickness dimension of the insulating paper and the width dimension of the groove are merely examples, and can be changed as appropriate. Further, various changes can be made to the shape, structure, and size of the fitting portion and the flange portion of each of the bobbins. Further, the number of slots of the stator core and the shape of the teeth portion can be changed as appropriate, of course.

In addition, the present invention can be applied not only to the compressor motor for air conditioner but also to stators of various motors. Although the embodiment of the present invention has been described above, the embodiment is presented as an example and is not intended to limit the scope of the invention. Such a novel embodiment can be implemented in various other forms, and can be omitted, replaced, and changed without departing from the gist of the invention. The embodiment and its modifications are included in the scope and gist of the invention, and in the invention described in the claims and the equivalent scope thereof.

What is claimed is:

1. A stator for a rotary electric machine comprising:
   a dividing core including a yoke portion and a teeth portion protruding in an inner peripheral direction from the yoke portion;
   bobbins that are made of an insulating material and are arranged on both ends in an axial direction of the dividing core;
   a coil that is wound around the bobbin; and
   insulating papers that are arranged along an inner peripheral surface of the yoke portion and a side surface of the teeth portion and insulate the coil and the dividing core from each other between both the bobbins, wherein
   each of the bobbins is formed with a groove into which an axial end of the insulating paper is inserted, and the groove is configured such that a width dimension of a part along the inner peripheral surface of the yoke portion is larger than a width dimension of a part along the side surface of the teeth portion,
   the inner peripheral surface of the yoke portion of the dividing core has a circular arc shape as viewed in an axial direction, and
   a part of each of the bobbins arranged on the inner peripheral surface of the yoke portion has, as viewed in the axial direction, an inner surface having a linear shape that intersects in a protruding direction of the teeth portion and an outer surface having a circular arc bulging shape so as to follow the circular arc shape, and is provided to be thicker than a part of each of the bobbins arranged on the side surface of the teeth portion.

2. The stator for a rotary electric machine according to claim 1, wherein
   a part of the groove along the inner peripheral surface of the yoke portion in each of the bobbins has a width that varies between a root side of the teeth portion and a side away from the root side.

3. The stator for a rotary electric machine according to claim 1, wherein
   a tip of the teeth portion of the dividing core includes a tip portion that spreads in a circumferential direction,
   each of the bobbins is integrally provided with a part corresponding to a surface facing the inside of the tip portion, and each of the insulating papers is provided with a part arranged along the surface facing the inside of the tip portion, and
   the groove is configured such that the part along the surface facing the inside of the tip portion is larger than the width dimension of the part along the side surface of the teeth portion.

4. The stator for a rotary electric machine according to claim 1, wherein the coil is configured such that a rectangular wire is wound.

* * * * *